United States Patent
Shen

(10) Patent No.: US 9,098,231 B2
(45) Date of Patent: Aug. 4, 2015

(54) APPARATUS AND METHOD FOR DISPLAYING IMAGE CHARACTERISTICS OF A SECOND DISPLAY ON A FIRST DISPLAY

(75) Inventor: Yu-Chuan Shen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 832 days.

(21) Appl. No.: 13/048,171

(22) Filed: Mar. 15, 2011

(65) Prior Publication Data
US 2011/0285608 A1 Nov. 24, 2011

Related U.S. Application Data

(60) Provisional application No. 61/346,912, filed on May 21, 2010.

(51) Int. Cl.
| G09G 5/00 | (2006.01) |
| G06F 3/147 | (2006.01) |
| G09G 3/34 | (2006.01) |
| G09G 3/36 | (2006.01) |

(52) U.S. Cl.
CPC .............. *G06F 3/147* (2013.01); *G09G 3/3406* (2013.01); *G09G 3/36* (2013.01); *G09G 2320/0673* (2013.01); *G09G 2360/04* (2013.01); *G09G 2380/02* (2013.01)

(58) Field of Classification Search
USPC ................. 345/1.1–3.4, 204, 690, 87, 55, 107
See application file for complete search history.

(56) References Cited

U.S. PATENT DOCUMENTS

| 5,146,328 | A | * | 9/1992 | Yamasaki et al. | 348/675 |
| 5,196,924 | A | * | 3/1993 | Lumelsky et al. | 348/674 |
| 2004/0268201 | A1 | * | 12/2004 | Haider et al. | 714/746 |
| 2006/0284805 | A1 | * | 12/2006 | Baek | 345/88 |
| 2010/0120470 | A1 | * | 5/2010 | Kim et al. | 455/566 |

* cited by examiner

*Primary Examiner* — Charles V Hicks
*Assistant Examiner* — Jeffrey Steinberg
(74) *Attorney, Agent, or Firm* — Edell, Shapiro & Finnan, LLC

(57) ABSTRACT

An image transform apparatus for displaying image characteristics of a second display on a first display includes a first transform unit, for transforming a first image signal of the first display to a first output signal according to a second gamma value associated with the second display; a second transform unit, for transforming the first output signal to a second output signal according to a transform gain function associated with the first display and the second display; and a third transform unit, for transforming the second output signal to a second image signal according to a first gamma value associated with the first display.

14 Claims, 11 Drawing Sheets

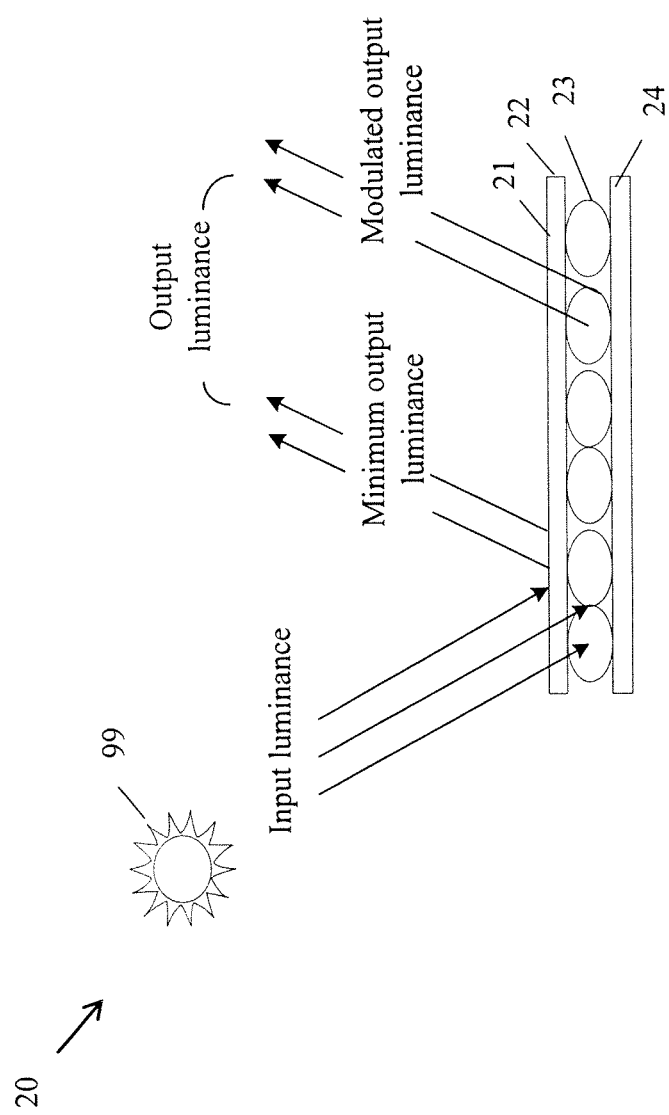

APPARATUS AND METHOD FOR DISPLAYING IMAGE CHARACTERISTICS OF A SECOND DISPLAY ON A FIRST DISPLAY

CROSS REFERENCE TO RELATED PATENT APPLICATION

This patent application claims the benefit of U.S. provisional patent application No. 61/346,912, filed on May 21, 2010.

FIELD OF THE INVENTION

The present invention relates to an image transform apparatus, and more particularly, to an apparatus for displaying image characteristics of a second display on a first display.

BACKGROUND OF THE INVENTION

A backlight component is an indispensable component in a widely-applied liquid crystal display (LCD). FIG. 1 is a schematic diagram of a conventional backlight display. From edges or the back part of an LCD 10, light from a backlight component 11 passes through a layer of twisted liquid crystals 12 controlled by input data, so that user views content displayed on the LCD 10 by receiving the light.

A so-called "e-paper" display, which is different from the LCD, has recently been developed. FIG. 2 shows a schematic diagram of a structure of a conventional e-paper display. Without an embedded backlight component as in the conventional LCD, the e-paper display 20 diffuses and modulates an input light in a substrate 21 by controlling via a controller 25 electronic ink 23 between a transparent upper electrode 22 and a segmented lower electrode 24 of the e-paper display 20 thereby reflecting an output light. Because a light source operating principle applied by the e-paper display 20 is different from that of the conventional LCD, image display quality of the e-pager display 20 is significantly different from that of the LCD 10.

FIG. 3 shows a schematic diagram of different image qualities and characteristics of different displays. A character or an image data file, e.g., a PDF file, is transmitted to a first data decoder 10a of the LCD 10 to generate a first decoded image signal, which is outputted to an LCD controller 10b to generate a first image signal that is outputted to an LCD panel 10c to generate an LCD image. The PDF file is transmitted to a second data decoder 20a of an e-paper display 20 to generate a second decoded image signal, which is outputted to an e-page display controller 20b to generate a second image signal that is outputted to an e-paper panel 20c to generate an e-paper image.

However, since the LCD 10 and the e-paper display 20 uses different physical materials and different light source operating approaches, LCD image characteristics, e.g., luminance and chrominance, do not translate well to the e-paper display. Accordingly, an image transfer apparatus for controlling different displays to display identical or similar image characteristics is in need.

SUMMARY OF THE INVENTION

An image transfer apparatus for controlling a first display to image characteristics of a second display comprises a first transfer unit, for transferring a first image signal of the first display to a first output signal according to a second gamma value associated with the second display; a second transfer unit, for transferring the first output signal to a second output signal according to a transfer gain function associated with the first display and the second display; and a third transfer unit, for transferring the second output signal to a second image signal according to a first gamma value associated with the first display.

Transfer of the image signal that is completed by the image transfer apparatus according to display characteristics of the first display and the second display is described below.

BRIEF DESCRIPTION OF THE DRAWINGS

The advantages and spirit related to the present invention can be further understood via the following detailed description and drawings.

FIG. 5 is a schematic diagram of parameters of an image transfer function in accordance with an embodiment of the present invention.

DETAILED DESCRIPTION OF THE PREFERRED EMBODIMENT

Figure 1:
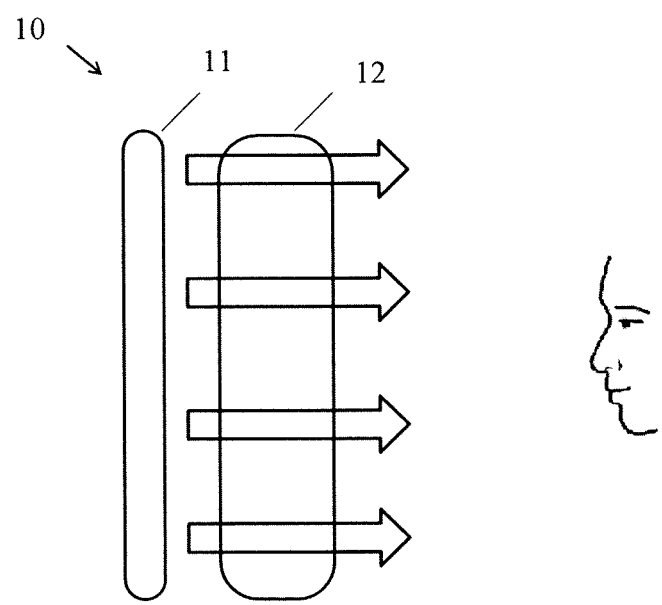
FIG. 1 is a schematic diagram of a conventional backlight display.
Figure 2:
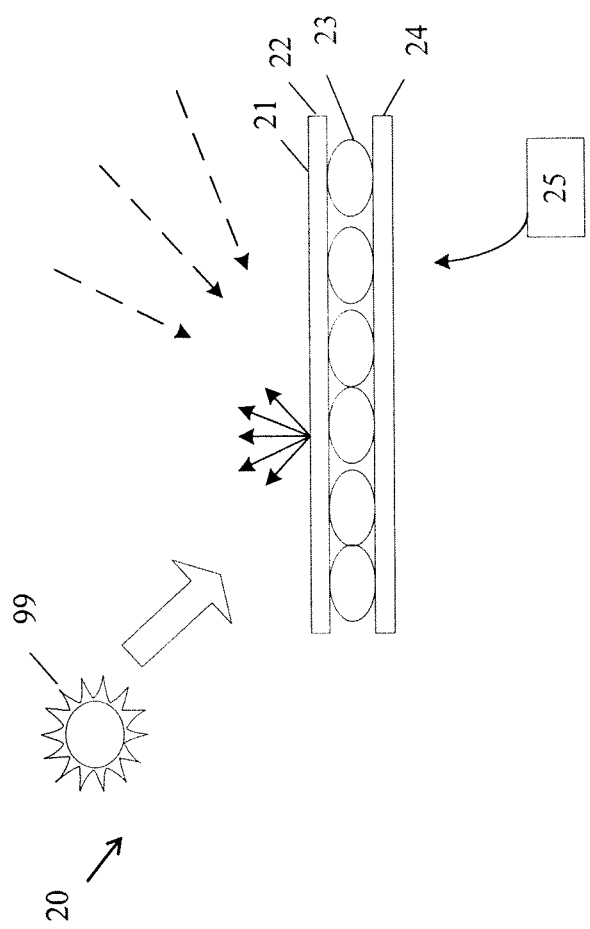
FIG. 2 is a schematic diagram of a structure of a conventional e-paper display.
Figure 3:
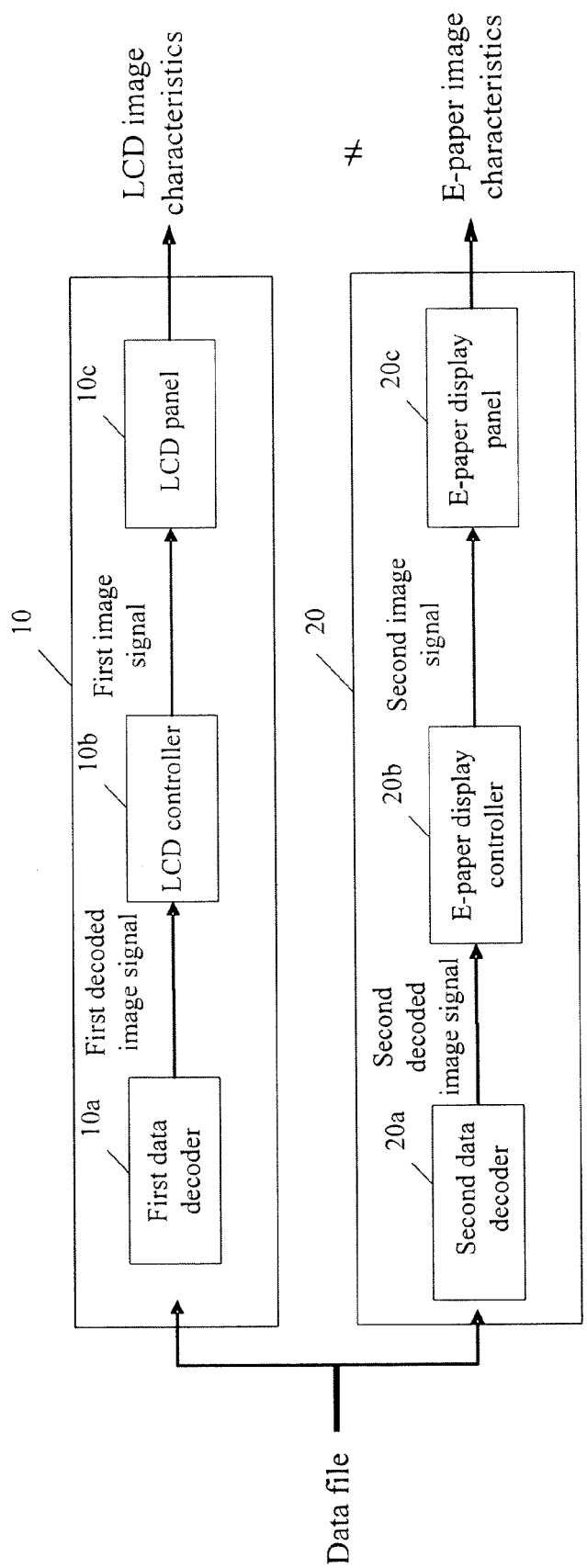
FIG. 3 is a schematic diagram of different image characteristics of different displays.
Figure 4:
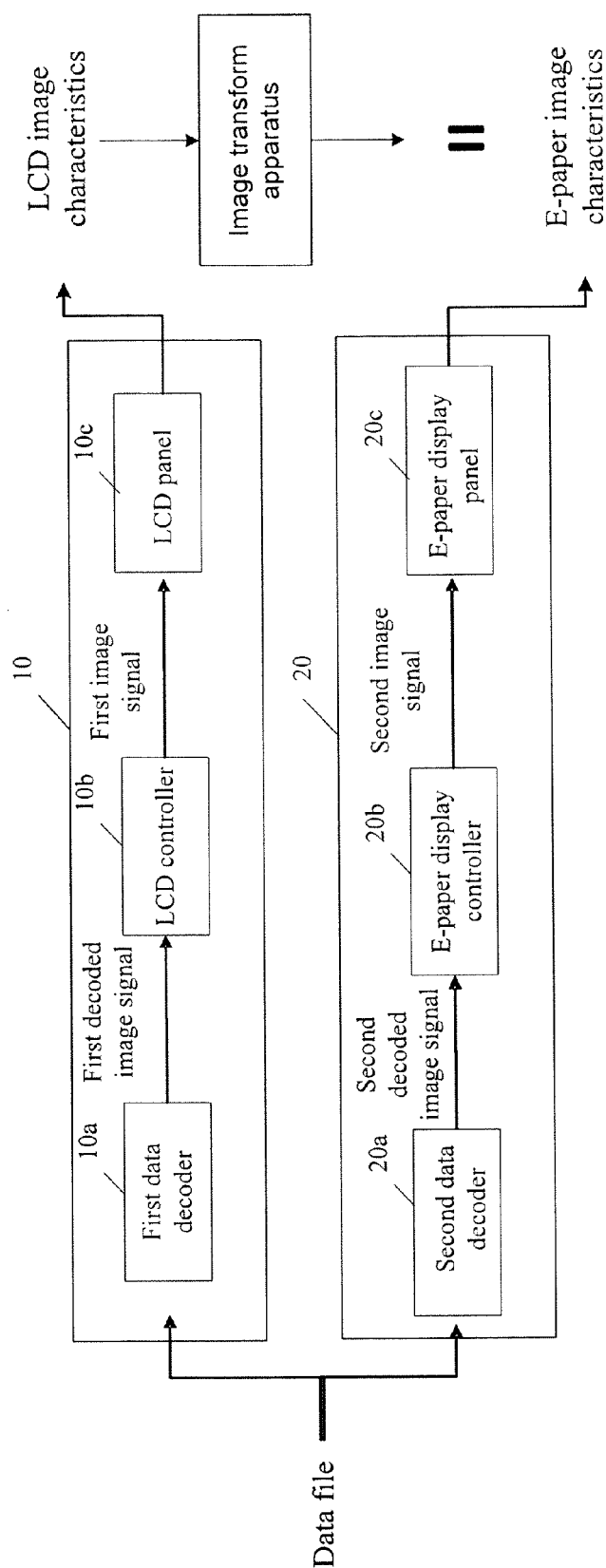
FIG. 4 is a schematic diagram of an image transfer apparatus for controlling different displays to display identical or similar image characteristics.

FIG. 4 is a schematic diagram of an image transform apparatus for controlling different displays to generate and display identical or similar image characteristics. Taking the LCD 10 and the e-paper display 20 as an example, an object of the present invention is to provide an image transform apparatus 30, which performs transform of a signal by parameters such as luminance and chrominance in a way that identical character or picture data files displayed on different display panels with different properties show identical characteristics with minimum power loss. Preferably, the image transform apparatus 30 is configured to be applicable to a broad spectrum of image formats including CIEXYZ, RGB, YCbCr or YUV, etc. Please note that, in FIG. 4, the image transform apparatus 30 disposed outside a display receives light signals of an image on the display detected by a physical light receiving/sensing device (not shown), then the light signals are digitalized to further perform signal processing according to the present invention. Before details of signal processing principles and manners of the image transform apparatus 30 are described, inventive features of the present invention are first explained below.

FIG. 5 is a schematic diagram of defining parameters of an image-transform function in accordance with the embodiment shown in FIG. 4 of the present invention. In FIG. 5 external light source 99 enters a substrate 21 of the e-paper display 20, then after reflection, an output light having an output luminance is transmitted. The output luminance is a sum of a minimum output luminance and a modulated output luminance, represented by:

$$L = L\_min + L\_modulated,$$

where L represents the output luminance, L_min is the lower limit (minimum) of output luminance provided by the e-paper display 20, and L_modulated is the modulated output luminance provided by the e-paper display 20. The modulated output luminance L_modulated is represented by:

$$L\_modulated = (L\_max - L\_min) \times (in)^r,$$

where L_max represents a upper limit (maximum) of output luminance provided by the e-paper display 20, "in" represents an input signal, and "r" represents a gamma value associated with the e-paper display 20. In an embodiment of the present invention, a unit of luminance is the lumen (lm) or candela (cd).

In a practical application of the foregoing equations, (in)r is a normalized scalar factor between 0 and 1.

As mentioned above, when the input signal "in" has a minimum value, (in)r is equal to 0, and the output luminance is represented by:

$$L = L\_min + L\_modulated = L\_min + (L\_max - L\_min) \times 0 = L\_min,$$

that is, the output luminance is equal to the minimum output luminance. When the input signal in has a maximum value, (in)$^r$ is equal to 1, and the output luminance is represented by:

$$L = L\_min + L\_modulated = L\_min + (L\_max - L\_min) \times 1 = L\_max,$$

that is, the output luminance is equal to the maximum output luminance.

Figure 6A:
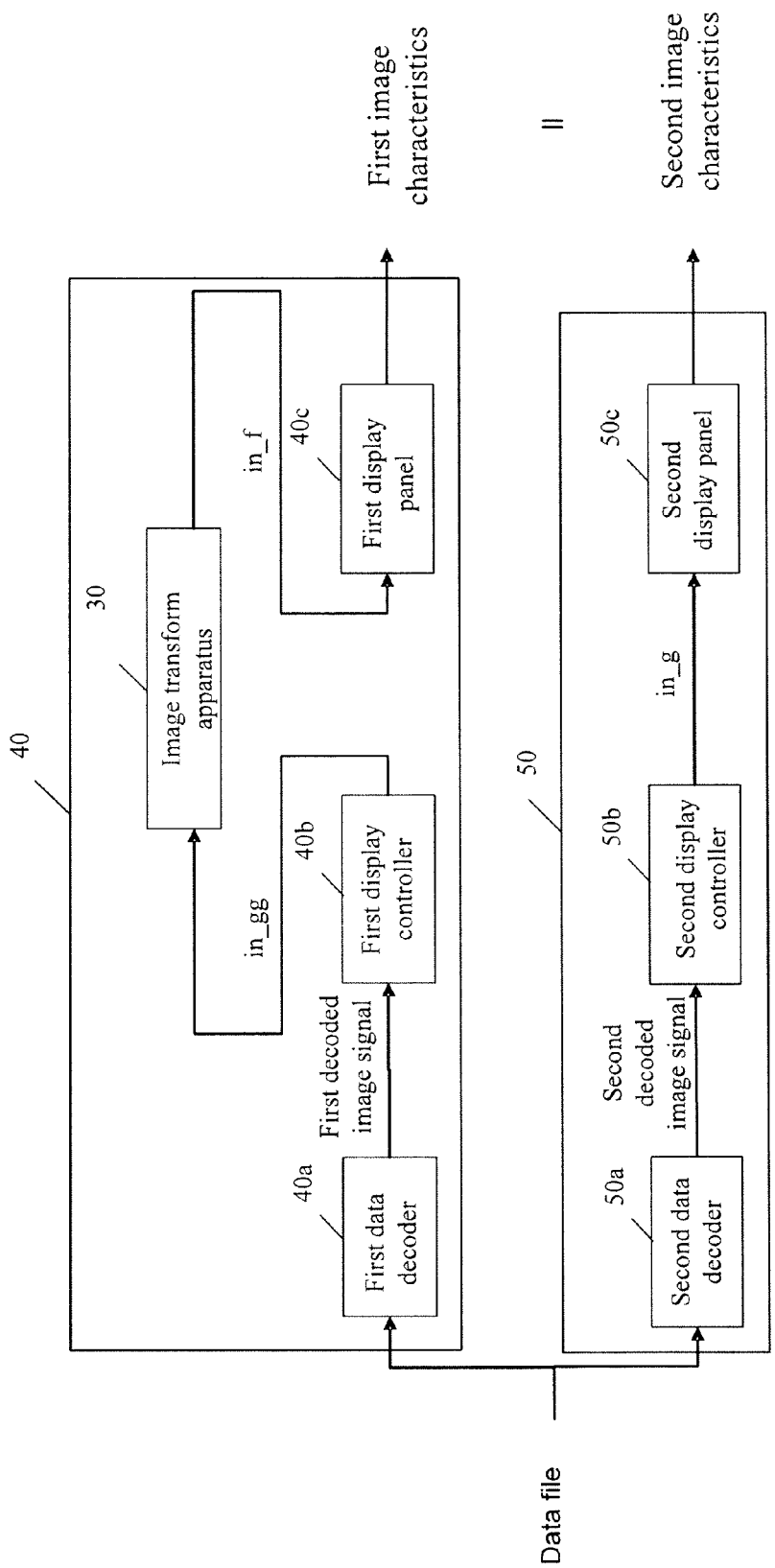
FIG. 6A is a schematic diagram of an image transfer apparatus for controlling different displays to display identical or similar image characteristics in accordance with an embodiment of the present invention.

FIG. 6A is a schematic diagram of an image transform apparatus for controlling different displays to display images having identical or similar image characteristics (i.e., the image characteristics viewed by eyes of human beings are identical or similar). A character or picture data file, e.g., a PDF file, is transmitted to a first data decoder 40a of a first display 40 to generate a first decoded image signal that is output to a first display controller 40b to generate a first image signal (in_gg), which is output to the image transform apparatus 30 for transforming to a characteristics-transformed image signal (in_f) to a first display panel 40c that displays a first image.

Likewise, the same character or picture data file is transmitted to a second data decoder 50a of a second display 50 to generate a second decoded image signal to a second display controller 50b to generate a second image signal (in_g), which is transmitted to a second display panel 50c for displaying a second image. Characteristics of the first image, such as luminance and chrominance, are identical to those of the second image.

A signal transform principle and process of the image transform apparatus 30 is described below.

With reference to FIG. 6A, the first image displaying on the first display 40 has a first luminance, and the first luminance is represented by:

$$\text{Light 1} = Lf\_min + (Lf\_max - Lf\_min) \times (in\_f)^{r\_f},$$

where Light1 represents the first luminance; Lf_max represents an upper limit (maximum) of output luminance, Lf_min represents a lower limit (minimum) of output luminance, (in_f) is the characteristics-transformed image signal, and (r_f) is a first gamma value.

The second display 50 displays a second image having second luminance, and the second luminance is represented by:

$$\text{Light 2} = Lg\_min + (Lg\_max - Lg\_min) \times (in\_g)^{r\_g},$$

where Light 2 represents the second luminance, Lg_max represents a maximum output luminance provided by the second display 50, Lg_min represents a minimum output luminance provided by the second display 50, (in_g) is the second image signal, and (r_g) represents a second gamma value.

In another embodiment of the present invention, because the first display 40 is an LCD, the first gamma value (r_f) can be set to 2.2 (widely known in the art), and because Lf_min is far smaller than Lg_min, Lf_min can be omitted in the equation, thus, the first luminance can be represented by:

$$\text{Light 1} = (Lf\_max) \times (in\_f)^{2.2}.$$

According to the concept of the present invention, it is desired that the first luminance is equal to the second luminance, so, assume that the result Light 1=Light 2, then:

$$(Lf\_max) \times (in\_f)^{2.2} = Lg\_min + (Lg\_max - Lg\_min) \times (in\_g)^{r\_g},$$

$$(in\_f)^{2.2} = [Lg\_min/Lf\_max] + [(Lg\_max - Lg\_min)/Lf\_max] \times (in\_g)^{r\_g},$$

$$(in\_f) = \{[Lg\_min/Lf\_max] + [(Lg\_max - Lg\_min)/Lf\_max] \times (in\_g)^{r\_g}\}^{(1/2.2)}.$$

Accordingly, a relationship between the characteristic-transformed image signal and the second image signal is represented by: $in\_f = [A + B \times (in\_g)^{r\_g}]^{(1/2.2)}$, where A=(Lg_min/Lg_max) is regarded as a transform offset (Transform_Offset), and B=(Lg_max−Lg_min)/Lf_max) is regarded as a transform gain (Transform_Gain). Therefore, the foregoing equation is represented by: $in\_f = [(\text{Transform\_Offset}) + (\text{Transform\_Gain}) \times (in\_g)^{r\_g}]^{(1/2.2)}$. That is, the characteristic-transformed image signal=[(the transform offset)+(the transform gain)×(the second image signal)$^{\text{the second gamma value}}]^{(1/2.2)}$.

However, since the first image signal (in_gg) and the second image signal (in_g) are digital signals, the first image signal (in_gg) is identical to the second image signal (in_g), i.e., (in_gg)=(in_g), and the foregoing equation presents as:

$$in\_f = [(\text{Transform\_Offset}) + (\text{Transform\_Gain}) \times (in\_gg)^{r\_g}]^{(1/2.2)}$$

That is, the characteristic-transformed image signal=[(the transform offset)+(the transform gain)×(the first image signal)$^{\text{the second gamma value}}]^{(1/2.2)}$.

The image transform apparatus 30 transforms the first image signal (in_gg) to the characteristic-transformed image signal (in_f) according to the transform gain and the transform offset associated with display characteristics (e.g., luminance and chrominance) of the first display 40 and the second display 50, and outputs the characteristic-transformed image signal (in_f) to the first display panel 40c to display the first display image, so that characteristics of the first display image such as luminance and chrominance are identical to those of the second display image. In this embodiment, the LCD is used as an example, so the first gamma value is 2.2; however, those skilled in the art will appreciate that different first gamma values can be used for different types of displays.

Figure 6B:
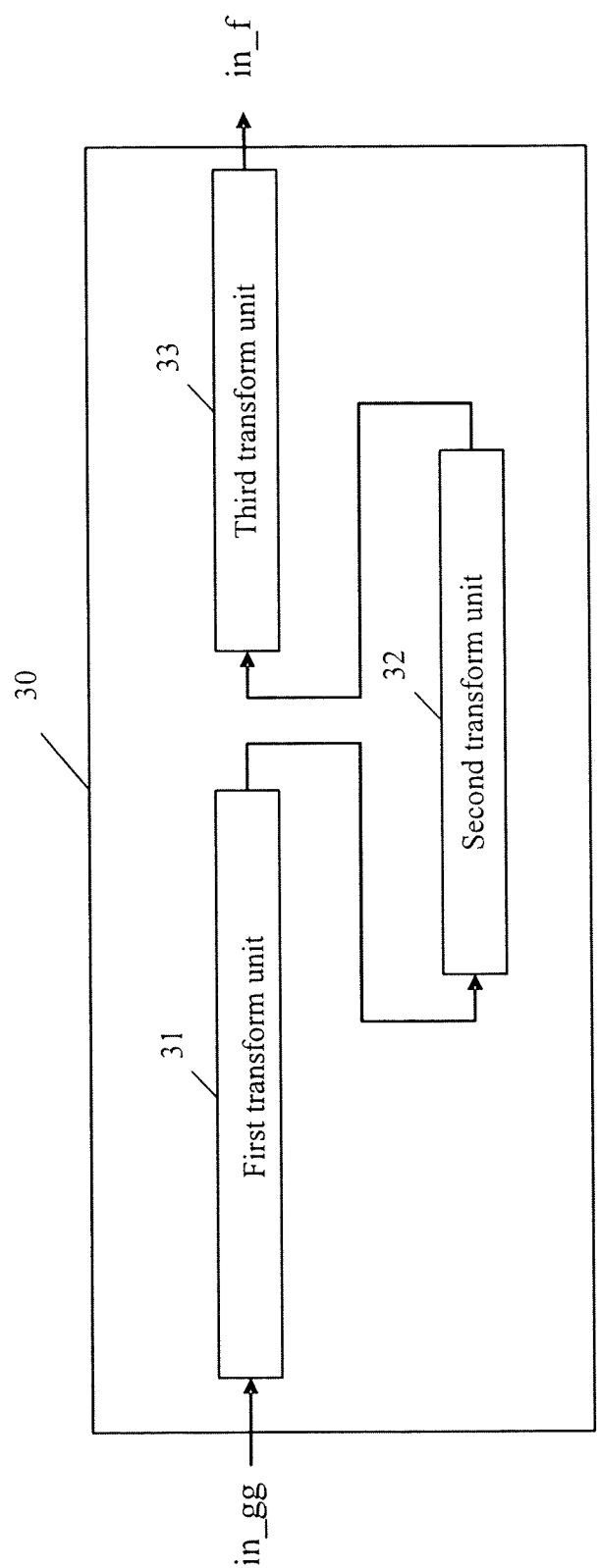
FIG. 6B to 6D are block diagrams of image transfer apparatuses in accordance embodiments of the present invention.
Figure 6C:
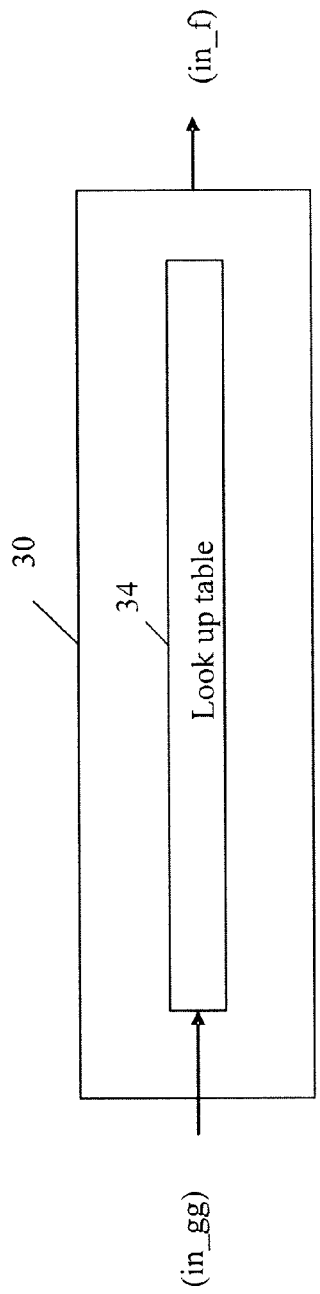
Figure 6D:
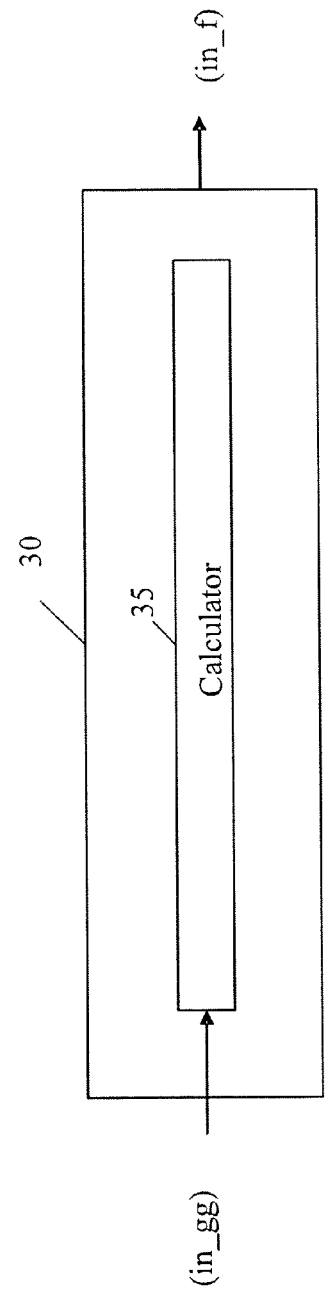

FIG. 6B to 6D are block diagrams of image transform apparatuses in accordance with embodiments of the present invention. With reference to FIG. 6B, the image transform apparatus 30 comprises a first transform unit 31, a second transform unit 32 and a third transform unit 33. In this embodiment, the foregoing image transform deduction and apparatus are realized by different transform units. Those skilled in the art will appreciate that the transform units 31, 32, 33, and similar transform units described herein, may be implemented as code or logic instructions stored on a tangible medium such as volatile or non-volatile memory. Alternatively, the code or logic instructions may be incorporated directly into hardware such as an application specific integrated circuit (ASIC). As shown in, e.g., FIG. 6B, the transform units include input and output nodes that are connected as shown to achieve the functionality described herein.

According to the foregoing theory, a relationship between the characteristic-transformed image signal and the second image signal is: $in\_f=[A+B\times(in\_g)r\_g]^{(1/2.2)}$, hence a first image signal in_gg as the input of the image transform apparatus can be transformed to a characteristic-transformed image signal as the output of the image transform apparatus through three transform units according to an embodiment described below.

The first transform unit 31 comprises a first lookup table or a first calculator. The first transform unit 31 receives and transforms the first image signal in_gg, and outputs a first output signal $L_1=(in\_gg)^{(r\_g)}$, i.e., the first output signal=(the first image signal)$^{(a\ second\ gamma\ value)}$.

The second transform unit 32 includes a second lookup table or a second calculator that receives and transforms the first output signal $L_1$, and outputs a second output signal: $L_2=(Transform\_Offset)+(Transform\_Gain)\times L_1$. That is, the second output signal=a transform offset+(a transform gain)×the first output signal, wherein the transform offset is (Lg_min)/(Lf_max), and the transform gain is (Lg_max−Lg_min)/(Lf_max). Lf_max represents a maximum (upper limit) output luminance provided by the first display 40, Lg_max represents a maximum (upper limit) output luminance provided by the second display 50, and Lg_min represents a minimum (lower limit) output luminance provided by the second display 50.

The third transform unit 33 comprises a third lookup table or a third calculator. The third transform unit 33 receives and transforms the second output signal $L_2$ to output a characteristic-transformed image signal (in_f) calculated as (in_f)= $L_2^{(1/r\_f)}$, that is, the characteristic-transformed image signal=the second output signal$^{(1/the\ first\ gamma\ value)}$.

Operation approach of an embodiment illustrated in FIG. 6C is similar to that of FIG. 6B, except that the first transform unit 31, the second transform unit 32 and the third transform unit 33 illustrated in FIG. 6B are integrated to a single lookup table 34 in FIG. 6C.

Operation approach of an embodiment illustrated in FIG. 6D is similar to that of FIG. 6B, except that the first transform unit 31, the second transform unit 32 and the third transform unit 33 are integrated to a single calculator 35 in FIG. 6D.

Figure 7:
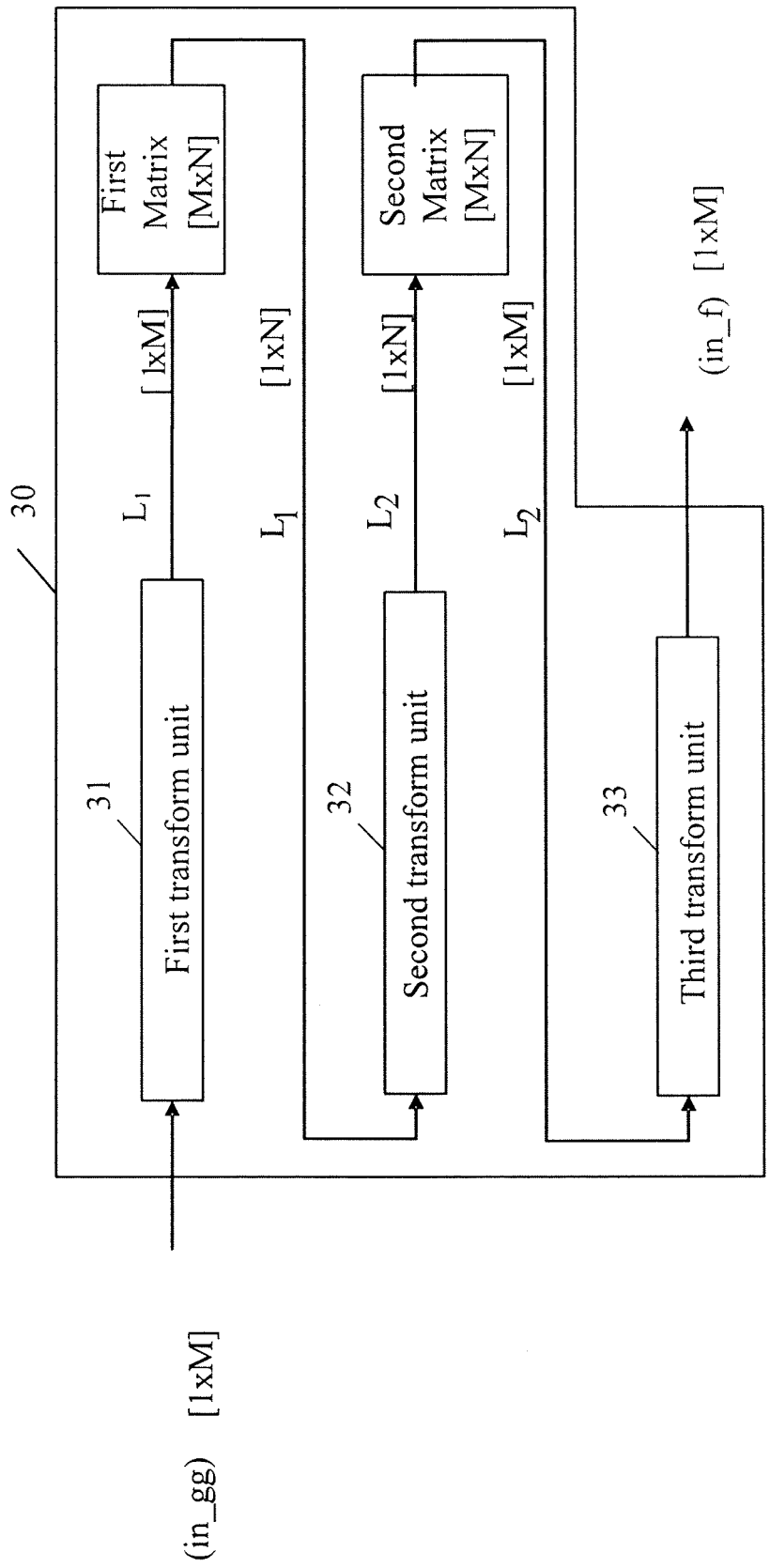
FIG. 7 is a block diagram of an image transfer apparatus in accordance with another embodiment of the present invention.

FIG. 7 is a block diagram of an image transform apparatus in accordance with another embodiment of the present invention. Operation approach of an embodiment illustrated in FIG. 7 is similar to that of FIG. 6B except that the image transform apparatus 30 further performs calculation of a first matrix and a second matrix. The first image signal (in_gg) having a dimension [1×M] with a first color format (e.g., RGB) is input to the image transform apparatus 30. The first image signal (in_gg) is transformed in a first transform unit 31 to obtain a first output signal having the dimension [1×M], which is multiplied with the first matrix having a dimension [M×N] to output the first output signal $L_1$ having a dimension [1×N] to a second transform unit 32. The first output signal $L_1$ having the dimension [1×N] has a second color format (e.g., YUV).

The first output signal ($L_1$) having the dimension [1×N] is transformed by the second transform unit to obtain the output signal having the dimension [1×N], which is multiplied with the second matrix having a dimension [N×M] to obtain a second output signal $L_2$ having the dimension [1×M]. At this point, the second output signal $L_2$ having the dimension [1×M] has the first color format. The second output signal $L_2$ having the dimension [1×M] is input to a third transform unit 33 to obtain a characteristic-transformed image signal (in_f) having the dimension [1×M] and the first color format.

The image transform apparatus 30 in FIG. 7 implements a concept of matrix dimension transform, which means the first color format is transformed to the second color format that facilitates calculations of the second transform unit 32 such as reduction of calculation complexity as well as increase of calculation speed and accuracy. After the second transform unit 32 completes the calculations, the second color mode is transformed back to the first color mode for further calculation.

Figure 8:
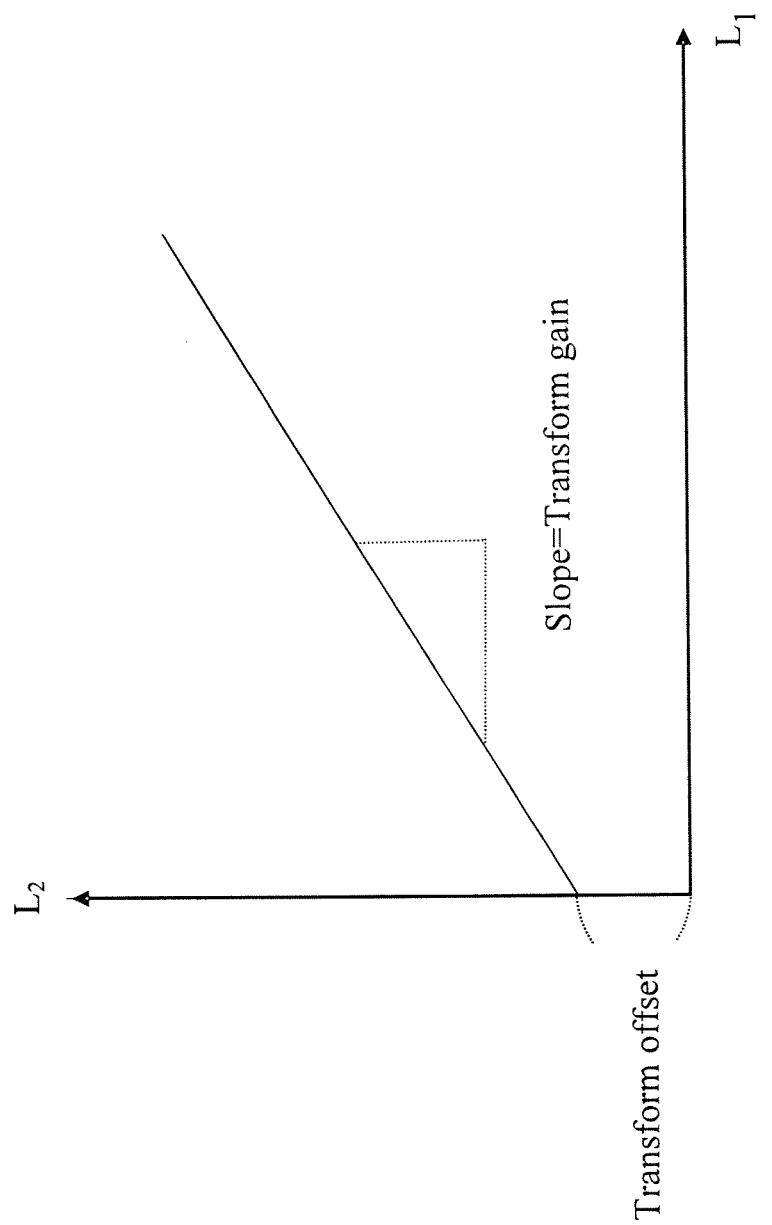
FIG. 8 is a schematic diagram of characteristics curves before and after an image signal is transferred in accordance with an embodiment of the present invention.

FIG. 8 is a schematic diagram of a characteristics curve of an image signal before and after image transform in accordance with an embodiment of the present invention. Reference is made to FIG. 8 and the foregoing equation: the second output signal=transform offset+transform gain×first output signal. The first output signal L1 is directly proportional to the second output signal L2, where a slope shown in FIG. 8, which represents the transform gain, is generated by dividing the second output signal by the first output signal. In addition, when the first output signal is 0, the second output signal is the transform offset.

Figure 9:
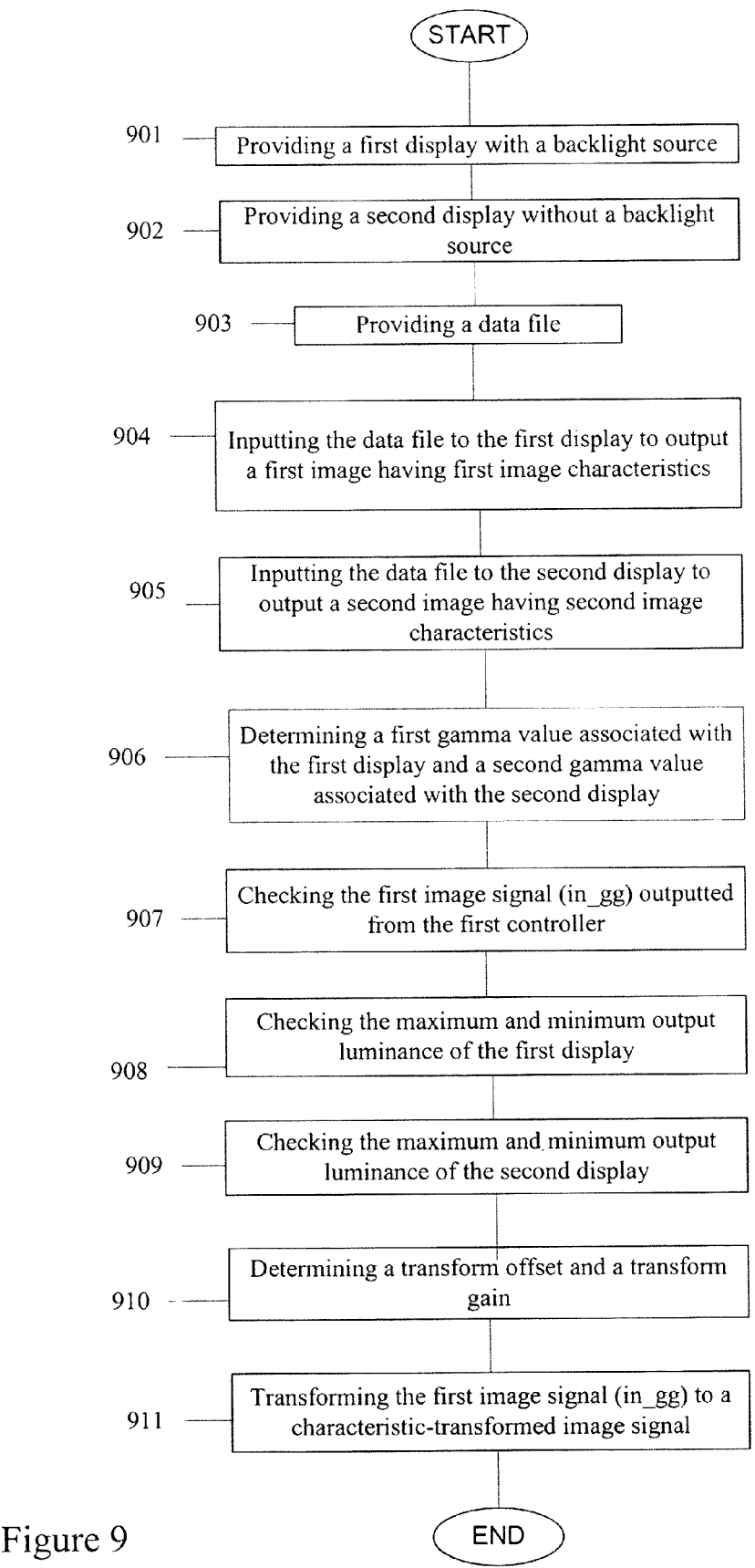
FIG. 9 is a flow chart of a method for controlling a first display to image characteristics of a second display in accordance with an embodiment of the present invention.

FIG. 9 is a flow chart for controlling a first display to show images with image characteristics of a second display in accordance with an embodiment of the present invention. In Step 901, a first display comprising a first controller, a first display panel and a backlight source is provided. In Step 902, a second display is provided, without any backlight source, comprising a second controller and a second display panel. In Step 903, a data file for displaying on displays is provided. In Step 904, the data file is input to the first display to output a first display image, which has first image characteristics comprising luminance and chrominance. Likewise, in Step 905, the data file is input to the second display to output a second display image, which has second image characteristics comprising luminance and chrominance. In Step 906, a first gamma value r_f associated with the first display and a second gamma value r_g associated with the second display are determined. In Step 907, a first image signal (ingg) output by a first controller of the first display is detected. In Step 908, a first minimum luminance Lf_min and a maximum luminance Lf_max associated with the first display are detected. In Step 909, a second minimum luminance Lg_min and a second maximum luminance associated with the second display are detected. In Step 910, a transform offset and a transform gain are determined. In Step 911, the characteristics of the first image signal in_gg are transformed to a characteristic-transformed image signal in_f, i.e., the characteristic-transformed image signal in_f=[(the transform offset)+(the transform gain)×(the first image signal)$^{the\ second\ gamma\ value}]^{1/the\ first\ gamma\ value}$.

As mentioned above, applying the image transform apparatus and method according to the present invention, different image characteristics of two different displays are transformed to generate identical or similar image characteristics. Accordingly, one same image input signal generates identical or similar display effects on different displays. For example, if optical properties allow, the image transform apparatus can be configured in the abovementioned e-paper display in the embodiments mentioned above. In conclusion, the features of the present invention are widely applicable to various types of display apparatuses and are thus not limited to the described LCD and e-paper devices.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image transform apparatus, for displaying image characteristics of a second display on a first display, the image transform apparatus comprising:
    a first transform unit comprising a first lookup table or a first calculator, for transforming a first image signal of the first display to a first output signal according to a second gamma value associated with the second display;
    a second transform unit, for transforming the first output signal to a second output signal according to a transform gain associated with the first display and the second display; and
    a third transform unit, for transforming the second output signal to a second image signal according to a first gamma value associated with the first display,
    wherein first lookup table and the first calculator define a relationship as follows:
    (the first output signal)=(the first image signal)$^{the\ second\ gamma\ value}$, and
    wherein (the second image signal)=(the second output signal)$^{1/the\ first\ gamma\ signal}$.

2. The apparatus as claimed in claim 1, wherein the first display is a backlight display, and the second display is a non-backlight display.

3. The apparatus as claimed in claim 2, wherein the first display is a liquid crystal display (LCD), and the second display is an e-paper display.

4. The apparatus as claimed in claim 1, wherein the second transform unit comprises a second lookup table or a second calculator.

5. The apparatus as claimed in claim 4, wherein the second lookup table and the second calculator define a relationship as follows:
    (the second output signal)=(a transform offset +the transform gain ×the first output signal),
    wherein the transform offset is defined as (Lg_min)/(Lf_max), the transform gain is defined as (Lg_max-Lg_min)/(Lf_max), Lf_max represents a maximum output luminance provided by the first display, Lg_max represents an upper limit of output luminance provided by the second display, and Lg_min represents a lower limit of output luminance provided by the second display.

6. The apparatus as claimed in claim 1, wherein the third transform unit comprises a third lookup table or a third calculator.

7. An image transform apparatus, for displaying image characteristics of a second display on a first display, the image transform apparatus comprising logic encoded on a tangible medium and accessible via an associated input and output, the logic being configured as a single lookup table or a single calculator, associated with a first image signal of the first display, and the logic further including a transform gain function associated with the first display and the second display, and a second gamma value of the second display,
    wherein the single lookup table or the single calculator defines a relationship as follows:
    (the second image signal)=(the second output signal)$^{1/the\ first\ gamma\ value}$,
    wherein,
    (the second output signal)=(the transform offset +the transform gain ×the first output signal),
    (the first output signal)=(the first image signal)$^{the\ second\ gamma\ value}$;
    wherein the transform offset is defined as (Lg_min)/(Lf_max), the transform gain is defined as (Lg_max-Lg_min)/(Lf_max), Lf_max represents an upper limit of output luminance provided by the first display, Lg_max represents a upper limit of output luminance provided by the second display, and Lg_min represents a lower limit of output luminance provided by the second display.

8. An image transform method, for displaying image characteristics of a second display on a first display, the image transform method comprising:
    transforming a first image signal of the first display to a first output signal according to a second gamma value associated with the second display;
    transforming the first output signal to a second output signal according to a transform gain function associated with the first display and the second display; and
    transforming the second output signal to a second image signal according to a first gamma value associated with the first display,
    wherein the step of transforming the first image signal to the first output signal according to the second gamma value associated with the second display is realized as:
    (the first output signal)=(the first image signal)$^{the\ second\ gamma\ value}$; and
    wherein the step of transforming the second output signal to a second image signal according to a first gamma value associated with the first display is realized as:
    (the second image signal)=(the second output signal)$^{1/the\ first\ gamma\ signal}$.

9. The method as claimed in claim 8, wherein the first display is a backlight display, and the second display is a non-backlight display.

10. The method as claimed in claim 9, wherein the first display is an LCD, and the second display is an e-paper display.

11. The method as claimed in claim 8, further comprising providing a first lookup table or a first calculator to transform the first image signal to the first output signal according to the second gamma value.

12. The method as claimed in claim 8, further comprising providing a second lookup table or a second calculator to transform the first output signal to the second output signal according to the transform gain function.

13. The method as claimed in claim 8, wherein the step of transforming the first output signal to the second output signal according to the transform gain function associated with display characteristics of the first display and the second display is realized as:
    (the second output signal)=(the transform offset +the transform gain ×the first output signal),
    wherein the transform offset is defined as (Lg_min)/(Lf_max), the transform gain is defined as (Lg_max-Lg_min)/(Lf_max), Lf_max represents a upper limit of output luminance provided by the first display, Lg_max represents a upper limit of output luminance provided by the second display, and Lg_min represents a lower limit of output luminance provided by the second display.

14. The method as claimed in claim 8, further comprising providing a third lookup table or a third calculator to transform the second output signal to the second image signal according to the first gamma value.

* * * * *